June 24, 1958 A. C. BECK ET AL 2,840,696

RADIO TRANSMITTING INSTALLATIONS

Filed June 22, 1955 2 Sheets-Sheet 1

Inventors
A. C. BECK
J. L. STORR-BEST
By Robert Harding Jr.
Attorney

RADIO TRANSMITTING INSTALLATIONS

Filed June 22, 1955 2 Sheets-Sheet 2

Inventors
A.C. BECK-
J. L. STORR-BEST
By Robert Harding Jr.
Attorney

United States Patent Office 2,840,696
Patented June 24, 1958

2,840,696

RADIO TRANSMITTING INSTALLATIONS

Arthur Cecil Beck and John Lloyd Storr-Best, London, England, assignors to International Standard Electric Corporation, New York, N. Y.

Application June 22, 1955, Serial No. 517,348

Claims priority, application Great Britain July 7, 1954

5 Claims. (Cl. 250—17)

Figure 1:
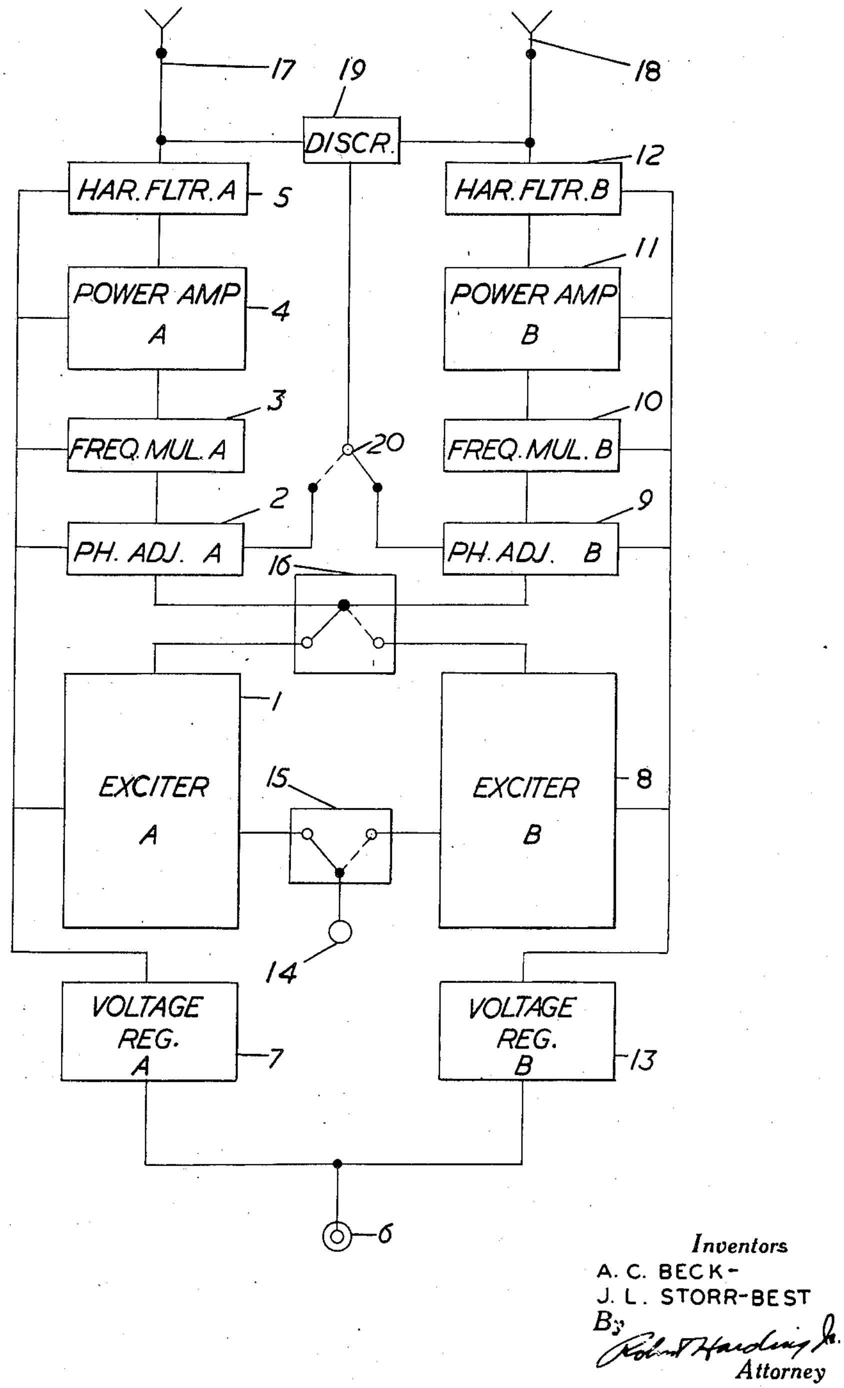

This invention relates to radio installations of the type employing a transmitting equipment having a plurality of like power amplifier branches coupled in parallel to a single source of high frequency energy. Under normal operating conditions the output of the equipment is the sum of the outputs of the power amplifier branches, but in the event of a breakdown of one of the branches the service can be maintained, though at reduced power, by the other branches. Such multi-branch transmitter installations are of particular value when it is desired to avoid the cost of supplying 100% spare equipment, and yet it is necessary to provide some means for avoiding relatively long interruptions of the service, as for example in the case of a broadcasting service. They are also of value, particularly at very high frequencies, when the desired output power necessitates the use of a plurality of output valves which cannot be efficiently operated as a single group.

The invention relates more particularly to multi-branch transmitter stations of the type in which the power amplifier branches include frequency multiplying stages, and in which means is provided for ensuring a desired phase relationship between the outputs of the branches of a transmitter in spite of phase drift in the branches. The inclusion of frequency multiplying stages in a power amplifier branch is common practice in transmitter stations operating at output frequencies above say 30 mc./s., especially (but not exclusively), when the intelligence is transmitted by some form of angular modulation e. g. frequency or phase modulation.

According to the present invention there is provided a radio multi-branch transmitter equipment comprising a source of modulating signals, an exciter unit adapted to provide a high frequency output modulated in response to signals from said source, two like power amplifier branches each responsive to output from said exciter unit and each including a frequency multiplying stage preceded by a voltage-controlled phase adjusting device, phase discriminating means responsive to the phase difference between the output of a selected one of said amplifier branches and the output of the other said amplifier branch the output of said discriminating means serving to supply the controlling voltage for said phase adjusting device in the said amplifier branch. Preferably each power amplifier branch has associated therewith an individual power supply voltage control device to control the power supply input voltage to the branch at any desired value within a continuous range from zero to full operating value. In an installation comprising such a multi-branch transmitter equipment the outputs of the separate branches are preferably applied each to a respective one of a plurality of cooperating antenna systems between which there is substantially zero mutual impedance.

Figure 2:
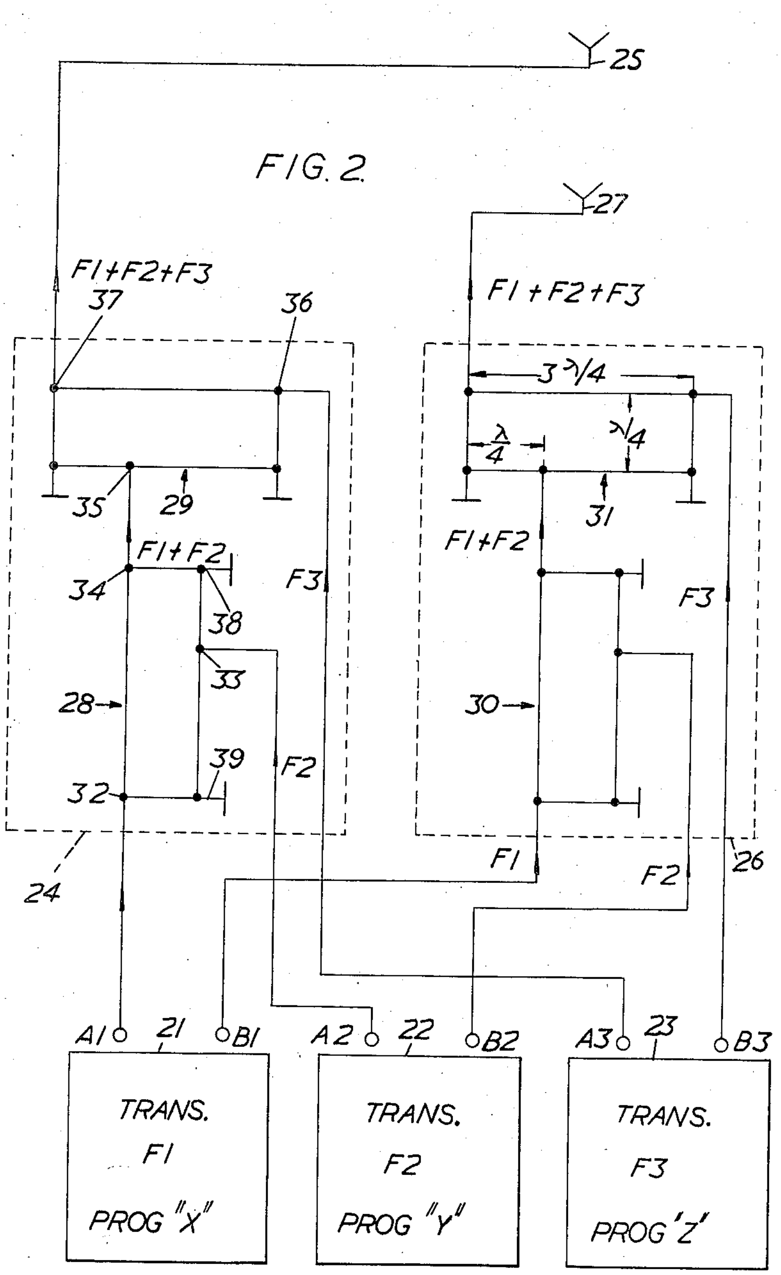

The invention will be better understood from the following description read in conjunction with the accompanying drawings in which:

Fig. 1 illustrates in block diagram form a radio installation comprising a single multi-branch-transmitter equipment in accordance with the invention, and Fig. 2 illustrates a radio installation comprising three multi-branch transmitter equipments all according to the invention, and sharing the same antenna arrangement. Referring now to Fig. 1, this illustrates a radio installation comprising a two-branch-transmitter equipment according to the invention. The equipment is in the form of what may be conveniently described as two-half-transmitters hereinafter labelled A and B.

The A half-transmitter comprises the exciter unit 1, together with a power amplifier branch comprising a phase adjusting device 2, followed by a frequency multiplier 3, power amplifier 4, and a harmonic filter 5, all of which receive their power supplies from mains indicated at 6 through a voltage regulating device 7. Similarly, the B half-transmitter comprises an exciter 8 followed by a power amplifier branch comprising a phase adjusting device 9, a frequency multipler 10, a power amplifier 11 and the harmonic filter 12, all receiving their power supply via voltage regulator 13.

Each of the exciter units 1 and 8 is adapted to provide a high frequency output modulated by signals from a signalling source indicated at 14, which may be for example, a line incoming from the broadcast studio.

In operation the output of only one exciter is required and accordingly switching arrangements 15 and 16 are provided to connect the modulation signals to whichever exciter is in use and to connect whatever exciter is in use to the two power amplifying channels. The drawing illustrates the case in which exciter unit 1 is utilised, the exciter unit 8 having all its power supplies at the normal working values and being ready to be put into service at a moment's notice by charging over switches 15 and 16. Thus the power amplifier branch comprising units 2, 3 and 4 and 5 is excited from exciter 1 as is also the power amplifier channel comprising units 9, 10, 11 and 12. The outputs of the two power amplifier branches are fed to respective antennae 17 and 18 which are arranged to operate as an array giving a desired radiation pattern. Preferably the antennae 17 and 18 are arranged to have substantially zero mutual impedance, so that failure of energisation of one antenna does not change the impedance presented by the other antenna.

It will be appreciated that in the equipment as so far described the variations of frequency or phase occurring within the exciter unit will affect the output of both channels to the same extent, but there is no guarantee that the phase changes occurring in the two power amplifier channels will be identical, and even if identical to start with, there is always some possibility that a differential phase change will occur during sustained operation.

Such differential phase change may be of considerable magnitude, sufficient to change seriously the radiation pattern. It is therefore desirable to provide means for maintaining constant phase relationship between the outputs of the two power amplifier channels. For this purpose, there is provided a phase discriminator 19, the two inputs of which are connected to the two outputs of the power amplifier branches. The discriminator output resulting from the above-mentioned differential phase change is applied through switch 20 to control one of the phase adjusting devices 2 and 9 to maintain the phase difference between the power amplifier branches constant at the desired value which, will usually be zero. It the case illustrated in Fig. 1, the "A" branch has been selected as the reference, and the discriminator output is applied to hold the phase of the "B" branch in relation to that of the "A" branch.

It will be observed that since the phase adjustment is applied prior to the frequency multiplying stage, a given amount of phase difference at the branch outputs will be corrected by a comparatively small change in the input to the frequency multiplier. If for example, the frequency multiplier 10 is adjusted to multiply by 3, a phase difference of 120° between the power amplifier branch outputs requires only a shift of 40° in the phase adjusting device. This reduction in the amount of phase control required enables a relatively simple form of phase adjusting to be adopted, and also decreases the possibility of trouble arising owing to ambiguous response from discriminator 19.

In multi-branch transmitter stations of the prior art, if one branch of the transmitter fails leaving the other(s) still working, it has not been possible to restore the complete service after repair of the fault without momentarily interrupting the service completely, in order to enable the branches of the transmitter to be paralleled.

In equipment according to the present invention, no such complete interruption is necessary. Let it be assumed that the B half-transmitter has been removed from service in order to repair a fault, leaving the A half-transmitter still operating. When the fault has been repaired, the B half transmitter is slowly run up to full power by means of the voltage regulator 13. As the supply voltage is gradually increased the B power amplifier branch output slowly increases giving sufficient input to discriminator 19 for the discriminator output to operate the phase adjusting means 9, and as the power supply voltage is increased, the setting of the phase adjusting means 9 is continuously readjusted as the branch output increases, until when full power is applied to the B half transmitter, the two halves of the equipment are already correctly adjusted for the desired phase difference between the channel outputs.

Turning now to Fig. 2, this illustrates an installation using three multi-branch-transmitter equipments each of the type detailed in Fig. 1, sharing the same antenna system.

The three transmitters 21, 22 and 23 operate on different respective frequencies F1, F2 and F3 which are sufficiently adjacent to one another to enable them to operate on the same antenna system and are yet sufficiently spaced to enable them to be readily separated out in the receiving stage. For example, the installation illustrated in Fig. 2 may be for broadcast purposes, operating on radiation frequencies in the neighbourhood of 90 mc./s., using frequency modulation, with a 400 kilocycle spacing between the transmitter carrier frequencies F1, F2 and F3, each transmitter carrying its own programme of modulating signals. For example, transmitter 21 may carry programme "X," transmitter 22 may carry programme "Y" and transmitter 23 may carry programme "Z."

Each of the three transmitters has two outputs indicated in Fig. 2 by the terminals marked A1—B1, A2—B2, A3—B3. The outputs from the A terminals are jointly coupled through a coupling device 24 for radiation from an antenna 25, while the B out-puts are jointly coupled by means of a coupling device 26 for radiation from antenna 27. The antennae 25 and 27 are preferably arranged to have zero mutual impedance; for example, each antennae may comprise a linear dipole radiator, the two radiators being vertically polarised and mounted colinearly one above the other.

The coupling devices 24 and 26 each comprise a number of combining networks which is one less than the number of twin transmitters whose outputs are to be combined. Since in the present example there are three transmitters each with two outputs, coupling device 24 here comprises two combining networks indicated at 28 and 29, coupling device 26 similarly comprising two combining networks as indicated at 30 and 31. Each network is adapted to combine inputs from two sources, and has two input points and one output point, and in each coupling device the first network combines two of the power amplifier channel outputs, the second network combines the output from the first network with the output of a third amplifier channel, and so on, the output of the final network being applied to the antenna system. Thus in coupling device 24 the first network 28 receives input from the A1 and A2 terminals of transmitters 21 and 22 at input points 32 and 33 respectively, while the second network 29 receives one input at point 35 from the output point 34 of network 28, and another input at point 36 from the A3 terminal of transmitter 23, and delivers combined outputs from A1, A2, and A3 at its output position 37, which is coupled to antenna 25. In similar manner the B1 and B2 outputs of transmitters 21 and 22 are combined in the first network 30 of coupling device 26, the output of network 30 being then combined in network 31 with the B3 output of transmitter 23, the output of network 31 being fed to antenna 27.

While any convenient type of combining network may be used, a preferred type takes the form of two transmission line sections of length respectively three quarter-wavelengths and five quarter-wavelengths at the mean operating frequency of the installation. These sections are connected by their ends to form a closed loop which is conveniently of rectangular formation dimensioned as shown at 31 in Fig. 2, with quarter wavelength spacing between the longer sides. In each network one of the input points (32 in network 28) is located at a junction between the sections, the other (33 in network 28) being located on the longer section at a distance of three quarters of a wavelength from the same junction, while the output (34 in network 28) is located at the other junction. Each network is provided with two transmission line stubs (38, 39 in network 28) connected across the longer of the sections at points each spaced from a respective one of the junctions by one-quarter wavelength. These stubs may be of any convenient form and are adjusted to provide a short circuit across the section to which they are connected at the carrier frequency of the input energy which is applied at the junction input point, at the same time presenting a high, but not critical shunt impedance at any other of the different carrier frequencies used by the station. Except for these stubs, all the combining networks in both coupling devices are identical.

While the principles of the invention have been described above with reference to specific embodiments, it is to be clearly understood that this description is made only by way of example, and not as a limitation of the scope of the invention. In particular, it is to be understood that the invention is not limited to installations using two-branch transmitters (sometimes referred to as "twin-transmitter" station) but may equally well be applied to transmitters having more than two branches.

What we claim is:

1. A radio multi-branch transmitter equipment comprising a source of modulating signals, two like exciter units, first switching means for applying said source of modulating signals to either of said exciter units to provide a high frequency output modulated in response to signals from said source, two like power amplifier branches each including a frequency multiplying stage preceded by a voltage-controlled phase adjusting device, second switching means for connecting said two power amplifier branches to either of said exciter units, phase discriminating means responsive to the phase difference between the respective outputs of said amplifier branches, third switching means for connecting the output of said discriminating means serving to supply the controlling voltage to either of said phase adjusting devices in the respective amplifier branches, and two power supply voltage control devices each associated with a respective one of said power amplifier branches and adapted for control of the power supply input voltage to the associated branch to any desired voltage within a continuous range from substantially zero to full operating voltage.

2. A radio installation comprising a multi-branch transmitter equipment according to claim 1, further comprising a pair of co-operating antennae systems one per amplifier branch, said systems having substantially zero mutual impedance, and means for applying the output of each said power amplifier branch to a respective one of said antenna systems.

3. A radio installation comprising a plurality of N multi-branch transmitter equipments each according to claim 1 said equipments operating on different but closely adjacent respective carrier frequencies and each equipment having M branches, a plurality of M cooperating antenna systems having substantially zero mutual impedance, and a plurality of M joint coupling means each adapted to couple a respective one of said antenna systems to a respective branch of each of said multi-branch transmitter equipments.

4. A radio installation according to claim 3, in which each said joint coupling means comprises (N—1) combining networks each having two input points and one output point, a first of said networks having its two input points coupled to respective ones of two of said branches, and each successive said network having one input point coupled to the output of the immediately preceding network and the other input point coupled to a respective one of the remaining said branches, the output point of the (N—1)th said network being coupled to a respective one of said antenna systems.

5. A radio installation according to claim 4, in which each said combining network comprises two transmission line sections respectively three-quarter-wavelengths and five quarter-wavelengths long at the mean operating frequency of the installation, said sections being connected at their ends to form a closed loop, said two input points being located respectively at a junction between said sections and at a distance of three quarter-wavelengths from said junction along the longer of said sections, said output point being located at the other junction between said sections, with two transmission line stubs connected across the longer of said sections at points each spaced from a respective junction by one quarter-wavelength, each said stub being adapted to provide a short circuit across said longer section at the carrier frequency of the input energy to be applied at the first mentioned said junction and to present a high shunt impedance at any other of said different carrier frequencies.

References Cited in the file of this patent

UNITED STATES PATENTS

| | | |
|---|---|---|
| 2,084,836 | Buschbeck | June 22, 1937 |
| 2,445,895 | Tyrrell | July 27, 1948 |
| 2,512,742 | Green et al. | June 27, 1950 |
| 2,531,419 | Fox | Nov. 28, 1950 |